F. R. PACKHAM & G. P. OATES.
DRAG BAR FOR FURROW OPENERS.
APPLICATION FILED DEC. 30, 1909.
976,490.
Patented Nov. 22, 1910.
3 SHEETS—SHEET 2.
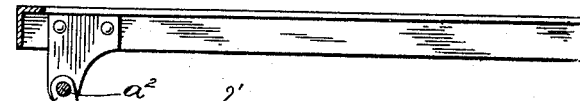
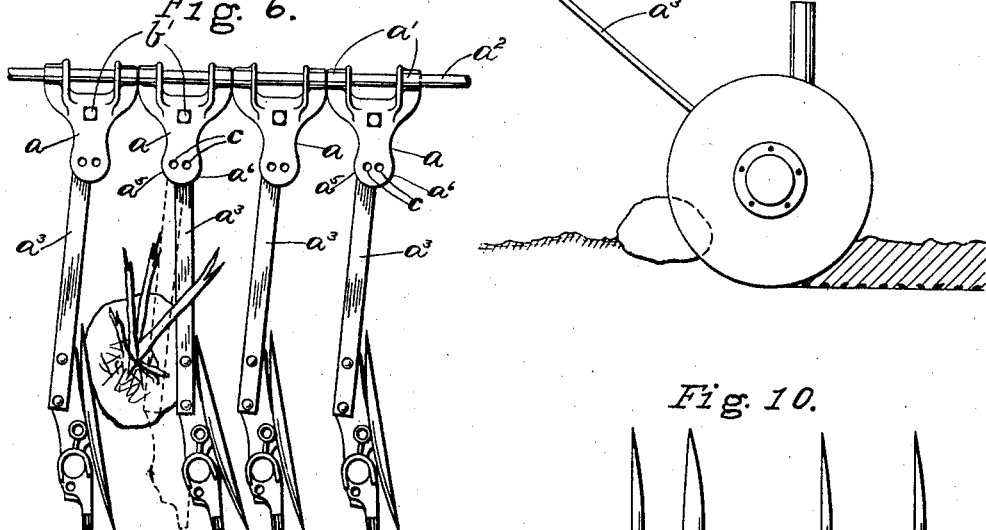
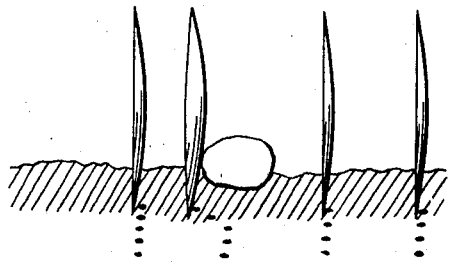
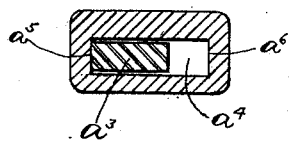
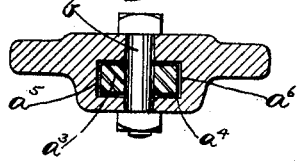

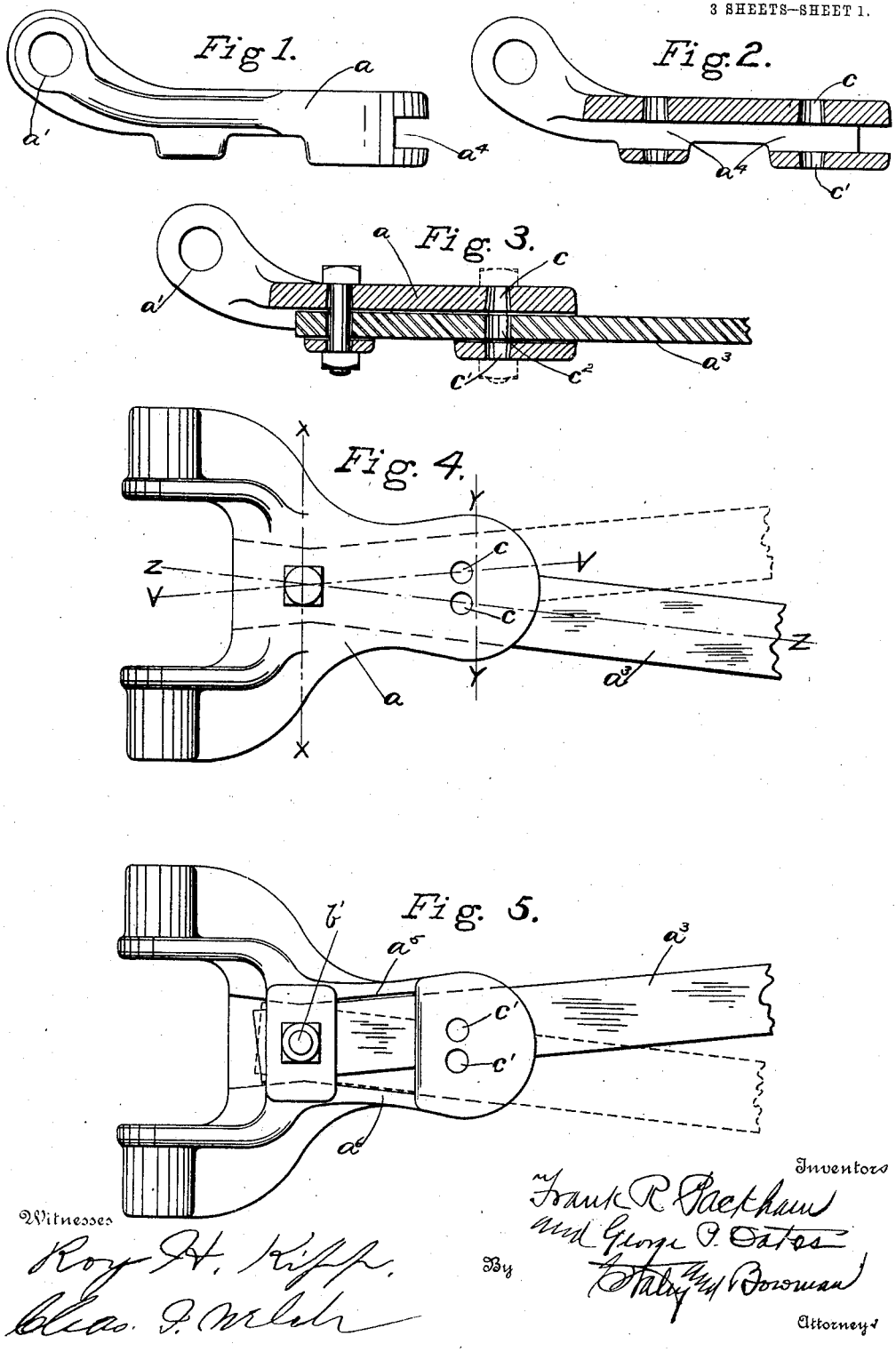

F. R. PACKHAM & G. P. OATES.
DRAG BAR FOR FURROW OPENERS.
APPLICATION FILED DEC. 30, 1909.
976,490.
Patented Nov. 22, 1910.
3 SHEETS—SHEET 3.
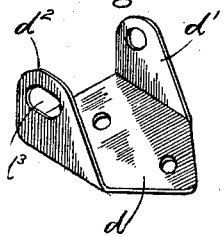
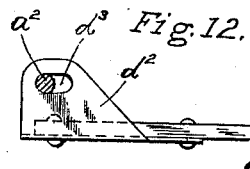
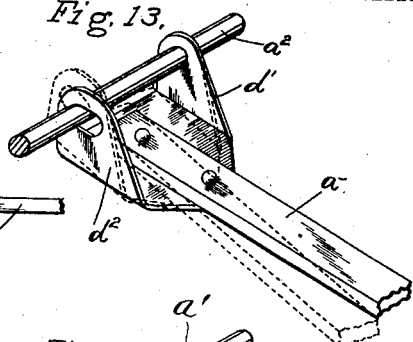
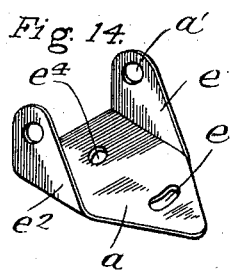
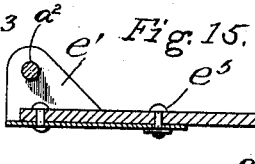
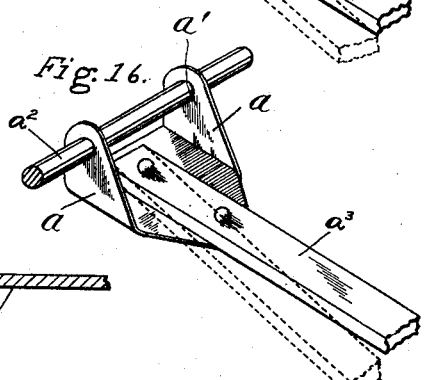
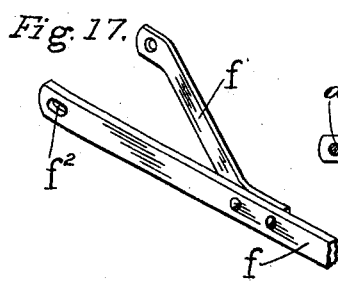
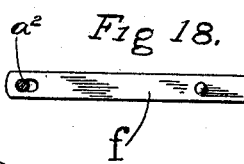
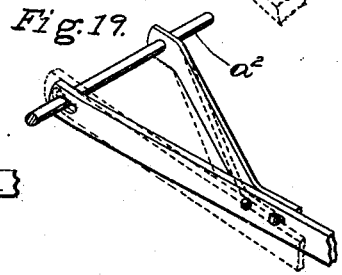
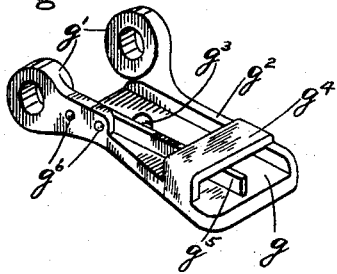
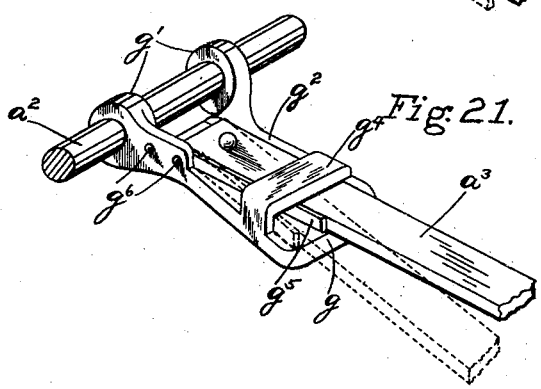
WITNESSES:
Roy H. Kipp.
Elias I. Welch.
INVENTORS
Frank R. Packham
George P. Oates
BY
Phillips Bowman
ATTORNEYS

UNITED STATES PATENT OFFICE.

FRANK R. PACKHAM AND GEORGE P. OATES, OF SPRINGFIELD, OHIO, ASSIGNORS TO THE AMERICAN SEEDING MACHINE COMPANY, OF SPRINGFIELD, OHIO, A CORPORATION OF OHIO.

DRAG-BAR FOR FURROW-OPENERS.

976,490. Specification of Letters Patent. Patented Nov. 22, 1910.

Application filed December 30, 1909. Serial No. 535,692.

*To all whom it may concern:*

Be it known that we, FRANK R. PACKHAM and GEORGE P. OATES, citizens of the United States, residing at Springfield, in the county of Clark and State of Ohio, have invented certain new and useful Improvements in Drag-Bars for Furrow-Openers, of which the following is a specification.

This invention relates to improvements in furrow openers for grain drills and particularly to the drag-bar construction of the furrow opener devices commonly used, including the disk, shoe or hoe form of furrow opener, though the invention as illustrated in the drawings is an attachment to a single disk furrow opener.

The prime object of the invention is to overcome the difficulties that have heretofore existed in the use of furrow openers for grain drills incident to obstacles in the practical operation thereof. It is apparent to any one versed in the art that the furrow openers themselves are subject to pressure on both sides, and, while with the disk furrow opener it is the usual practice to operate same at an angle to the line of draft so that the concave side of the disk is subject to what might be called the normal resistance of opening the land-side of the furrow, still the convex or opposing side of the disk will necessarily meet obstacles or encounter difficulties that may tend to force the furrow opener laterally, and considerable difficulty has been encountered by undue straining of the parts or breakage thereof by reason of the fact that the furrow opener was not adapted to overcome such difficulties. Of course, this difficulty is not peculiar to disk furrow openers alone but is applicable to a greater or less degree to all other forms of furrow openers. In a general way, the improvements illustrated and described herein consist in making the furrow opener of convertible character so that it can be operated as of the old type of construction wherein the drag-bar does not permit of lateral displacement of the furrow opener independent of the frame of the machine, or it may be converted into one where the furrow opener will have a permissible lateral displacement to overcome difficulties in operating same under conditions where obstacles must be met that tend to either strain or break the parts in the manner heretofore described.

Referring to the drawings: Figure 1 is a side view of our improved cross-head. Fig. 2 is a longitudinal sectional view of said cross-head, the section being on the line *v—v* of Fig. 4. Fig. 3 is a longitudinal sectional view of the same and also of the forward portion of a drag-bar connected thereto, the section being on the line *z—z* of Fig. 4. Fig. 4 is a top plan view showing the cross-head and a portion of the drag-bar. Fig. 5 is a bottom plan view of the same. Fig. 6 is a top plan view showing a series of drag-bars, and furrow openers with our improved form of connection to the draft rod for same, one of the furrow openers being shown under the influence of an obstacle throwing the furrow opener to the limit of its lateral movement. Fig. 7 is a transverse section on the line *y—y* of Fig. 4. Fig. 8 is a side view of the furrow opener and a portion of the frame of the machine, looking at the concave side of the disk, showing an obstacle encountered by the convex side thereof. Fig. 9 is a transverse section on the line *x—x* of Fig. 5. Fig. 10 is a rear view of a series of disks showing one of the disks displaced laterally by an obstacle. Figs. 11 to 21 inclusive are modifications hereinafter referred to.

Like reference letters indicate like parts throughout the several views.

Referring to Figs. 6 and 8 it will be noted that the furrow opener commonly used in grain drills is illustrated as mounted at one end of the drag-bar which is pivoted to a draft rod or analogous device on the frame of the machine. These machines are sometimes supported by carrying wheels or the carrying-wheels may be dispensed with, but this invention relates entirely to the attachment of the furrow opener to the machine. It is common practice to pivotally mount the furrow opener and to this end the drag-bar is usually of yoke form at the end, and hinged or pivoted to a rod at the forward part of the frame permitting the furrow opener to have a limited vertical movement independent of the frame of the machine, and this up-and-down movement is usually controlled by spring pressure. By that is meant that the spring or analogous device, usually employed to hold the furrow opener in the ground, permits it to rise upwardly to a limited extent against the tension of the spring. An improved form of cross-head is shown, indicated by the reference letter *a*, and this cross-head is pivotally mounted at $a'$ on the draft rod $a^2$ the form of the attachment being of yoke form such that the cross-head is supported at two points somewhat removed from each other. The free end of the cross-head is so formed and so connected to the drag-bar $a^3$ that the drag-bar can have a limited lateral movement independent of the cross-head, or when it is desired, same can be converted into a rigid form of construction described later. In the latter case the drag-bar is susceptible of two different adjustments as illustrated and described herein. The cross-head is preferably formed with a pocket $a^4$ or some form of hollow opening, into which the upper end of the drag-bar will be inserted, the lower end or free end of the drag-bar being connected to the furrow opener. This pocket is formed tapering with its widest portion at the rear of the cross-head; this taper terminating at a point on the line $x$—$x$ in Fig. 4, and from there on the pocket is flared so as to permit of the movement of the drag-bar. In the formation of the free end of the cross-head it is important to so form it that the upper end of the drag-bar can not only be pivotally supported therein but also may have combined therewith stops or the equivalent thereof to limit the amount of lateral movement of the drag-bar. In the construction illustrated and described in the drawings the upper end of the drag-bar, $a^3$, fits within the pocket or socket $a^4$ and the bolt $b'$ extends through the top and bottom of the socket and through the end of the drag-bar thereby forming a pivot for the drag-bar. The cross-head is also formed so that the side walls $a^5$ and $a^6$ of the socket $a^4$ form stops to regulate the amount of lateral displacement of the disk and drag-bar.

As shown in Figs. 6 and 7 the normal resistance due to the concave side of the disk operating as the working face of the disk will cause the drag-bar to assume the position shown at the right of Fig. 6, to wit, the drag-bar, $a^3$, will be forced against the wall or stop $a^5$.

It will be seen from Fig. 6 that there are employed a plurality of furrow openers and those illustrated are a single concavo-convex disk set at an angle with the line of draft, and the normal angular position of the disk is shown at the left hand side of said Fig. 6, wherein the drag bar $a^3$ of said left hand disk is normally against the stop $a^5$ and in this position the disk runs at the fixed minimum angle to the line of draft; the devices being so arranged that the angle may be increased from the normal but never lessened therefrom and it is quite important that this relation should be maintained. Now, when a clod or other obstacle passes within the space between any two disks, it will be apparent that one disk will coöperate with the other to cause a lateral swinging movement of one of said two disks to permit said obstacle to pass through said space while maintaining one of the two disks at its normal angular position and increasing the angle of the other. In Fig. 6 there is an instance illustrated wherein an obstacle is shown within the space between two disks at the extreme left hand side of that view. The first disk is held in its normal position and the opposing disk is swung laterally, thereby increasing its angle to the line of draft. And this increased angle is desirable in order to furnish sufficient suction to maintain the proper depth of the disk; in other words, the disk would naturally tend to float to the surface by reason of the obstacle that is within the space between the two disks, but by causing the angle of the disk to the line of draft to increase, its tendency to float will be overcome and the disk will maintain its proper working position. But any obstacle that is met by the opposite side or convex side of the disk will tend to move the disk bodily to the right until the upper end of the drag-bar meets the wall or stop $a^6$. This will insure a lateral displacement of the disk such that it can automatically adjust itself to overcome difficulties due to the obstacles encountered by the non-working side of the disk or the land side of any ordinary furrow opener. It is apparent that if the drag-bar and cross-head were of one solid structure so arranged as to not permit any movement of the drag-bar independent of the cross-head, having the cross-head mounted in the usual way of the draft rod, an obstacle passing between two furrow openers and of such character as to force one of the furrow openers laterally to permit the obstacle to pass between them would tend to strain or break the parts and often raise the furrow opener entirely out of the ground thereby preventing the proper seeding of the ground at a uniform depth in the ground, in fact deposit the seed on top of the obstruction and not in the soil around the obstruction.

One principal advantage is so arranging the cross-head and drag-bar that they may be converted from a form of furrow opener permitting a limited lateral movement of the drag-bar independent of the cross-head to one where there is no such lateral movement by the insertion of a bolt. As disclosed in Figs. 4 and 5, there is preferably shown two sets of registered openings $c$ and $c'$ extending through the top and bottom walls of the socket formed in the cross-head and an opening $c^2$ formed in the drag-bar adapted to register with either one of the first-mentioned openings. A bolt can be readily inserted through either pair of openings, so that the drag-bar can be rigidly connected to the cross-head in any desired position and thereafter the device can be operated to all intents and purposes as a solid drag-bar construction.

In Figs. 11 and 12 and 13 is illustrated a modification, in which the cross-head is formed in the nature of a plate $d$, to which the drag-bar $a^3$ is permanently secured by riveting or otherwise. The plate $d$ has upturned perforated ears, $d'$ and $d^2$ pivoted on the draft-bar $a^2$. The perforation in the ear $d^2$ is in the nature of a slotted opening $d^3$ so as to permit the cross-head, together with the drag-bar and furrow opener attached thereto, to swing laterally, there being sufficient clearance between the perforation in the ear $d'$ and the draft-rod to permit this lateral movement.

In Figs. 14, 15 and 16 is shown a further modification. The cross-head $a$, in these views is of the same type as the one shown in Fig. 11, having the upwardly extending perforated ears, $e'$ and $e^2$ adapted to be pivoted to the draft-rod $a^2$. Instead of elongating one of these perforations, however, for the purpose of permitting lateral movement, a slotted perforation $e^3$ is provided in the plate $a$ to permit the drag-bar $a^3$ to swing laterally with respect to the plate; the drag-bar being pivoted to said plate as at $e^4$ and a bolt or other device $e^5$ is passed through the said drag-bar and elongated perforation $e^3$ so as to limit the lateral swing of the drag-bar.

In Figs. 17, 18 and 19, the cross-head is dispensed with and the bifurcated type of drag-bar is employed. The drag-bar $f$, in this case is provided with a brace $f'$ in a manner well known, the ends of the drag-bar and brace being perforated and pivoted to the draft-rod $a^3$. The perforation in the end of the drag-bar $f$ is elongated as indicated at $f^2$ which will permit the drag-bar and the attached furrow opener to swing laterally.

In Figs. 20 and 21, a slightly different form of cross-head is employed. The cross-head $g$ has the projecting ears $g'$ adapted to be pivoted on the draft-rod $a^2$ and also has along its sides converging ribs $g^2$ which act as stops for the drag-bar $a^3$ which is pivoted to said cross-head at $g^3$. A loop, $g^4$ serves to retain the cross-head and drag-bar together. In this instance, we have shown a flat spring $g^5$, one end of which is secured to the cross-head as at $g^6$; this spring extending along the side of the drag-bar and tending normally to force the same to working position. The object of this spring is to overcome any sluggish movement of the drag-bar and furrow opener in returning to their proper working position after having been deflected laterally by an obstacle.

Having thus described our invention, we claim:

1. In a grain drill, the combination of a draft rod, cross heads pivotally mounted on the draft rod, a plurality of disk furrow openers comprising drag bars and disks rotatably mounted near the ends of the drag bars and placed at an angle to the line of draft, means for pivotally mounting the drag bars on the cross heads and stops for limiting the lateral swinging movement of each furrow opener whereby any obstacle bearing against two opposing furrow openers will cause one of the furrow openers to swing laterally increasing the angle of the disk to the line of draft, substantially as specified.

2. In a grain drill, the combination of a plurality of disk furrow openers with draft-rods and cross-heads and pivotal connections between the cross-heads and drag-bars, devices for holding each disk in its normal position at a fixed minimum angle with the line of draft, whereby an obstacle will hold one disk in its normal position, causing its opposing disk to swing laterally, increasing the angle of said last-mentioned disk, substantially as specified.

3. In a grain drill, the combination of a plurality of concavo-convex disk furrow openers with draft-rods and cross-heads and pivotal connections between the cross-heads and drag-rods, devices for holding each concavo-convex disk in its normal position at a fixed minimum angle with the line of draft, whereby any obstacle will hold one concavo-convex disk in its normal position causing its opposing concavo-convex disk to swing laterally increasing the angle of said last-mentioned concavo-convex disk, substantially as specified.

In testimony whereof, we have hereunto set our hands this 23rd day of December, 1909.

FRANK R. PACKHAM.
GEORGE P. OATES.

Witnesses:
CHAS. I. WELCH,
THAYER K. MORROW.